(12) United States Patent
Hayashi et al.

(10) Patent No.: US 12,145,657 B2
(45) Date of Patent: Nov. 19, 2024

(54) TAILGATE LOCKING/UNLOCKING SYSTEM

(71) Applicant: Honda Motor Co., Ltd., Tokyo (JP)

(72) Inventors: Kaz Hayashi, Revelstoke (CA);
Takeshi Kamiyama, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 306 days.

(21) Appl. No.: 17/951,454

(22) Filed: Sep. 23, 2022

(65) Prior Publication Data

US 2024/0101198 A1    Mar. 28, 2024

(51) Int. Cl.
*B62D 33/037*    (2006.01)
*B62D 33/03*    (2006.01)
*E05B 17/20*    (2006.01)
*E05B 83/16*    (2014.01)

(52) U.S. Cl.
CPC .......... *B62D 33/037* (2013.01); *B62D 33/03* (2013.01); *E05B 17/2034* (2013.01); *E05B 83/16* (2013.01)

(58) Field of Classification Search
CPC .. B62D 33/027; B62D 33/0273; B62D 33/03; B62D 33/037; E05B 17/2034; E05B 77/04; E05B 63/0013; E05B 83/10; E05B 83/16; E05B 83/36; E05B 83/42
See application file for complete search history.

(56) References Cited

U.S. PATENT DOCUMENTS

| | | | |
|---|---|---|---|
| 7,651,141 B2 | 1/2010 | Kraenzle | |
| 8,903,605 B2 | 12/2014 | Bambenek et al. | |
| 10,316,569 B2 | 6/2019 | Kim et al. | |
| 10,882,570 B1* | 1/2021 | Sharp | B62D 33/037 |
| 11,214,992 B1* | 1/2022 | Gentry | B62D 33/0273 |
| 11,331,989 B2 | 5/2022 | Lutzka et al. | |
| 2003/0001403 A1* | 1/2003 | Mizuta | B62D 33/037 296/57.1 |
| 2017/0067284 A1* | 3/2017 | Wang | E05C 3/00 |
| 2020/0079441 A1* | 3/2020 | Gallagher | B62D 33/027 |
| 2021/0086843 A1* | 3/2021 | Ishii | B62D 33/03 |
| 2023/0347990 A1* | 11/2023 | Sharkar | B62D 33/0207 |
| 2024/0101198 A1* | 3/2024 | Hayashi | B62D 33/037 |

(Continued)

FOREIGN PATENT DOCUMENTS

| | | |
|---|---|---|
| CN | 100545001 | 9/2009 |
| CN | 201376763 | 1/2010 |
| CN | 104005616 | 5/2016 |

(Continued)

*Primary Examiner* — Gregory A Blankenship
(74) *Attorney, Agent, or Firm* — JCIP GLOBAL INC.

(57) ABSTRACT

A tailgate locking/unlocking system is adapted to lock or unlock a tailgate of a vehicle. The tillage locking/unlocking system includes a rod shaft, a first lock structure, a second lock structure, at least one handle assembly, a first receiver, and a second receiver. The rod shaft is disposed in the tailgate of the vehicle and extended along a width direction thereof. The rod shaft has a first end and a second end opposite to the first end. The first and second lock structures are coupled to the first and second ends. The handle assembly is pivotally coupled to the first or second end of the rod shaft and coupled to the first or second lock structure. The first and the second receivers are disposed on a first lateral side and a second lateral side of a body of the vehicle for engaging with the first and second lock structures.

11 Claims, 9 Drawing Sheets

(56) References Cited

U.S. PATENT DOCUMENTS

2024/0253713 A1\* 8/2024 Reedy .................. B62D 33/037

FOREIGN PATENT DOCUMENTS

| | | |
|---|---|---|
| CN | 213650770 | 7/2021 |
| DE | 3447873 | 7/1986 |
| DE | 3928077 | 2/1991 |
| EP | 2845822 | 3/2015 |
| JP | 6476066 | 2/2019 |
| KR | 200156432 | 9/1999 |
| WO | 2018028181 | 2/2018 |

\* cited by examiner

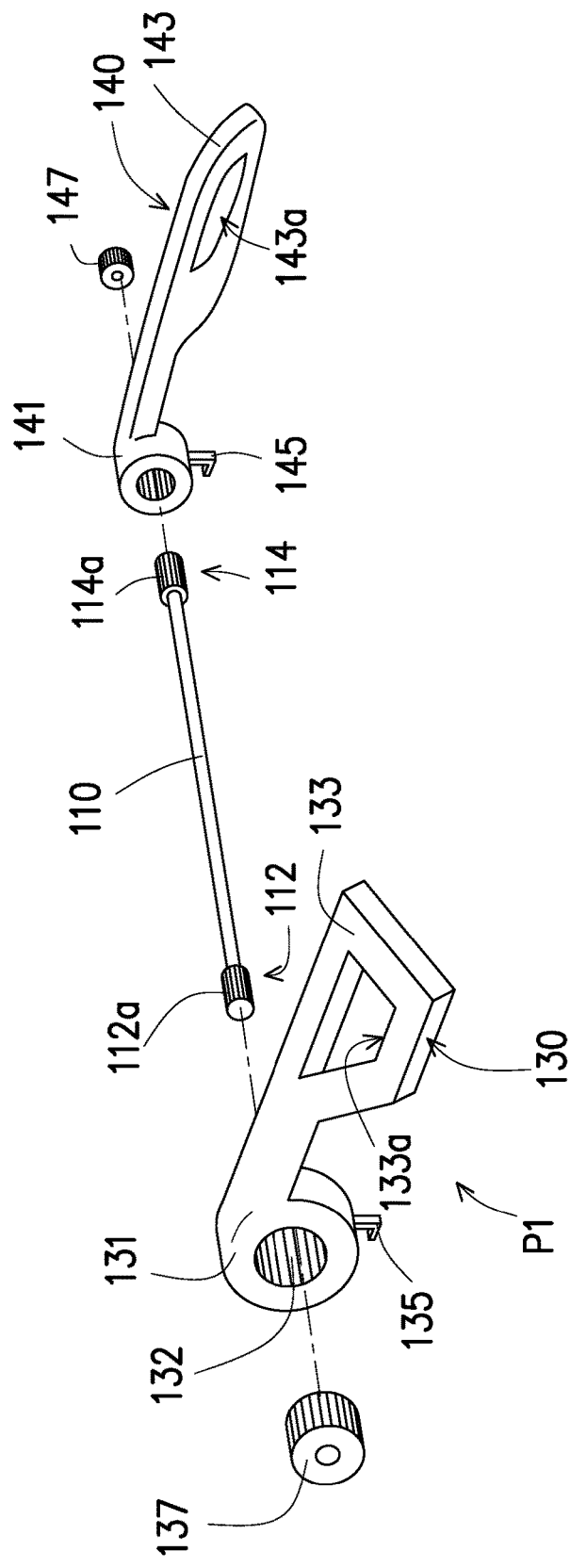
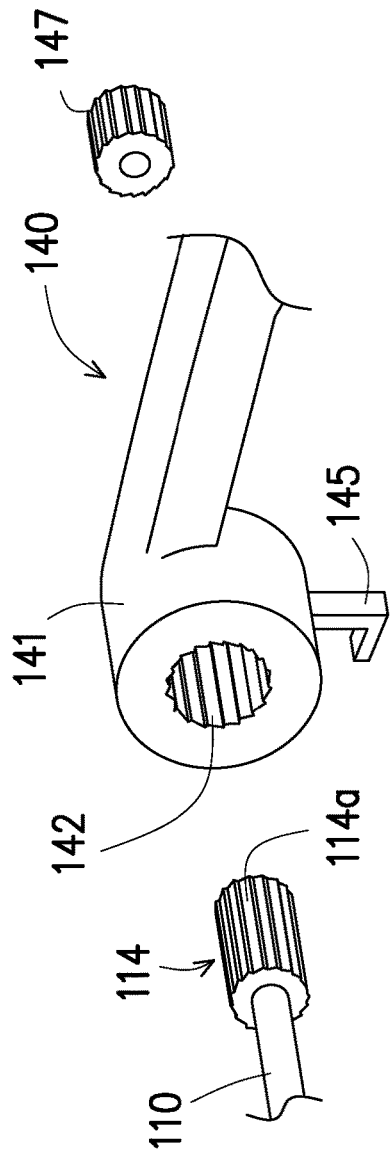
FIG. 2A
FIG. 2B

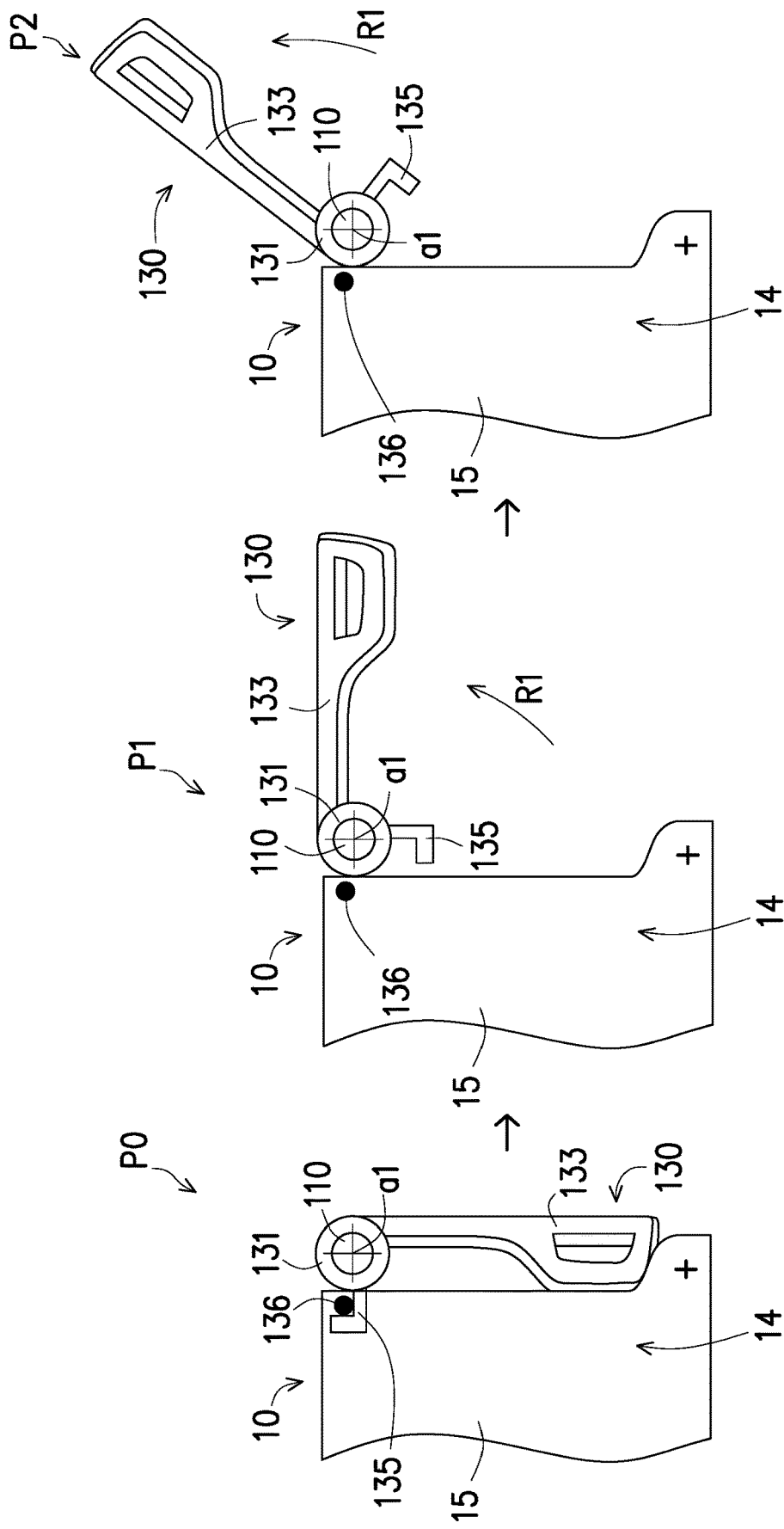

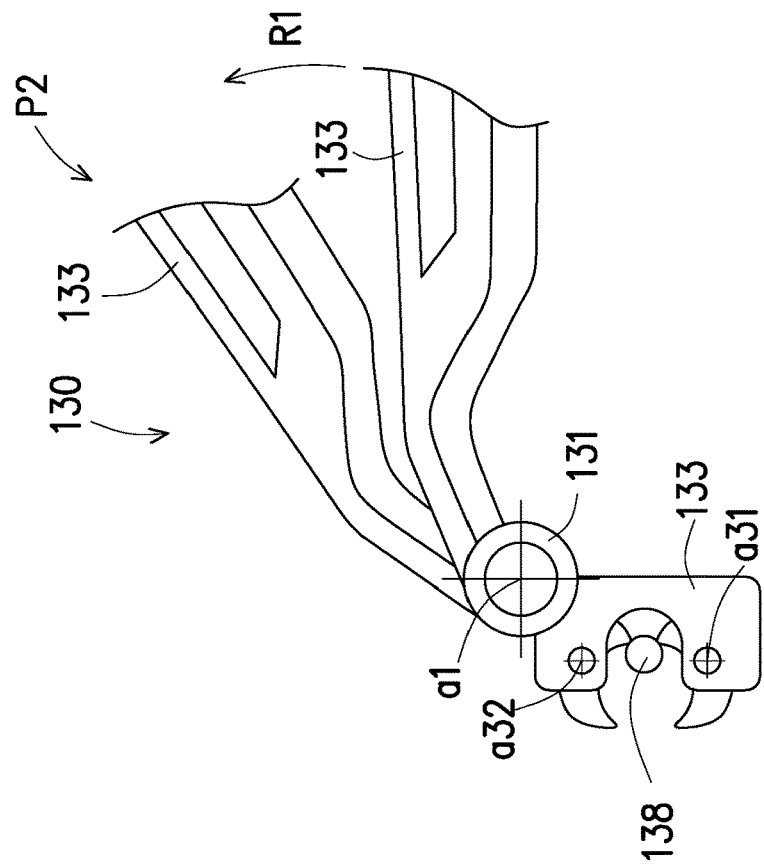
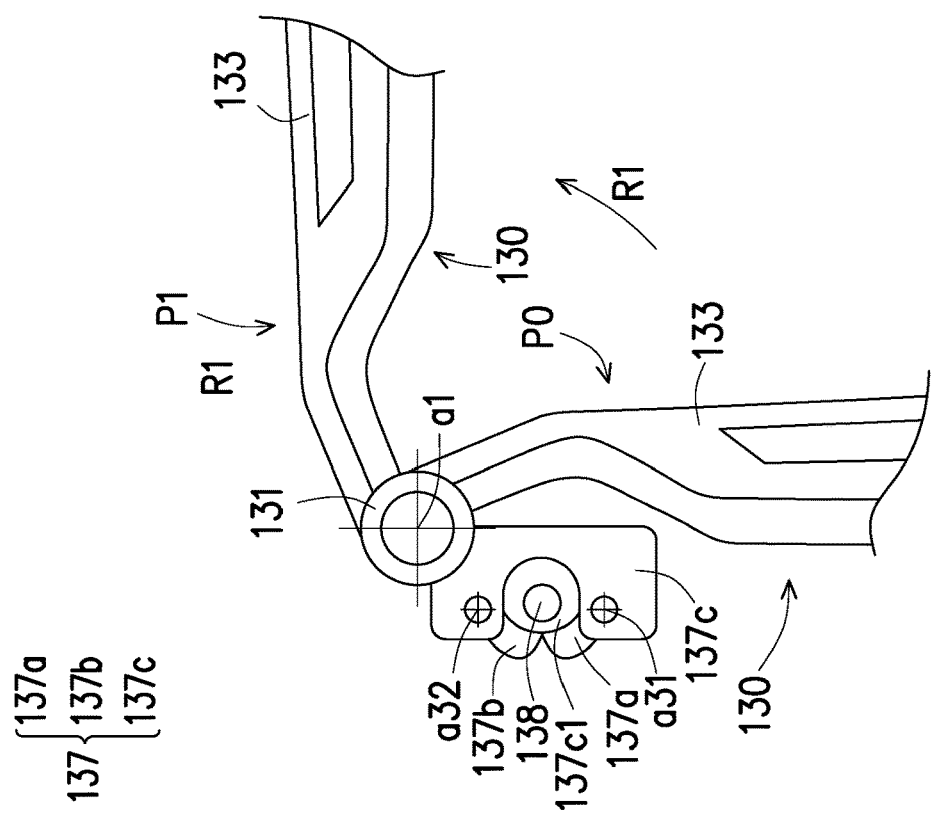

TAILGATE LOCKING/UNLOCKING SYSTEM

BACKGROUND

In utility vehicles, such a mini truck, a side-by-side vehicle (SSV), or a utility task vehicle, may have handles for the user to open the tailgate thereof. In the operation of the utility vehicle for opening and closing the tailgate, the handles disposed on both lateral sides of the vehicle have to be operated by the user simultaneously to lock or unlock the tailgates of the utility vehicles. With an increase in dimensions of the vehicles, and thus an increase in widths of the vehicles, it becomes more difficult to simultaneously control or operate both handles disposed for locking the tailgates of the vehicles to the lateral sides thereof and open the tailgate for loading the cargo to a loading space of the utility vehicle through a single user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a tailgate locking/unlocking system is adapted to lock or unlock a tailgate of a vehicle. The tillage locking/unlocking system includes a rod shaft, a first lock structure, a second lock structure, at least one handle assembly, a first receiver, and a second receiver. The rod shaft is disposed in the tailgate of the vehicle and extended along a width direction thereof. The rod shaft has a first end and a second end opposite to the first end. The first lock structure is coupled to the first end. The second lock structure is coupled to the second end. The handle assembly is pivotally coupled to the first and or the second end of the rod shaft and coupled to the first lock structure or the second lock structure. The first receiver is disposed on a first lateral side of a body of the vehicle for engaging with the first lock structure. The second receiver is disposed on a second lateral side of the body of the vehicle for engaging with the second lock structure. Both the first lock structure and the second lock structure are respectively locked to or unlocked form the first receiver and the second receiver by rotating the handle assembly.

BRIEF DESCRIPTION OF THE DRAWINGS

FIG. 2A is a schematic diagram that illustrates an exemplary tailgate locking/unlocking system of a vehicle in accordance with some embodiments in the disclosure.

FIG. 2B is a schematic diagram that illustrates an enlargement view of a portion of an exemplary tailgate locking/unlocking system of FIG. 2A in accordance with some embodiments in the disclosure.

FIG. 4A to FIG. 4C are schematic motion diagrams that illustrate motion steps of an exemplary handle assembly of FIG. 3 in accordance with some embodiments in the disclosure.

FIG. 5A and FIG. 5B are schematic diagrams that illustrate an exemplary handle assembly of a tailgate locking/unlocking system in accordance with some embodiments in the disclosure.

Figure 1:
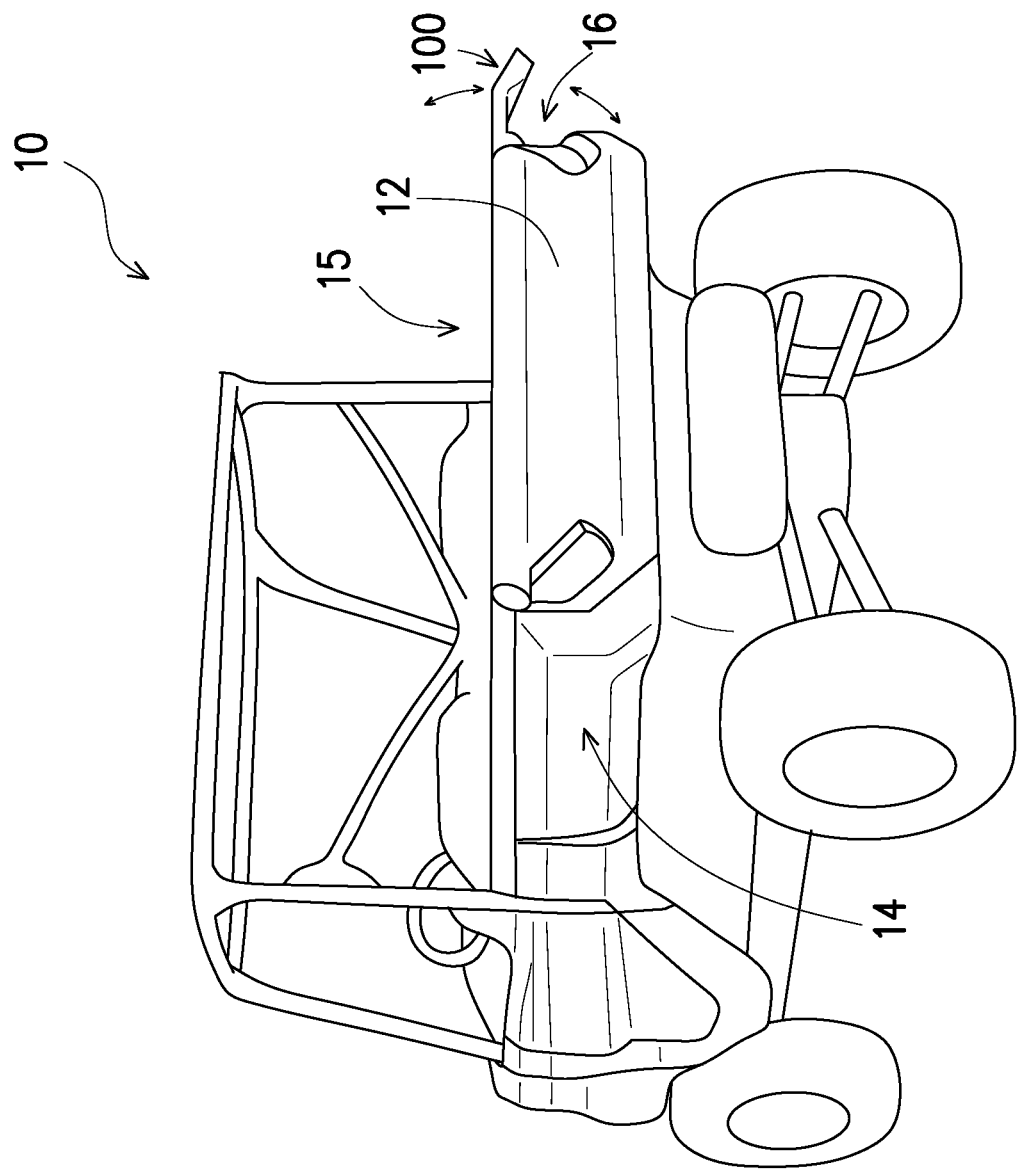
FIG. 1 is a schematic diagram that illustrates an exemplary vehicle having a tailgate locking/unlocking system with some embodiments in the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

FIG. 1 is a schematic diagram that illustrates an exemplary vehicle 10 having a tailgate locking/unlocking system 100 in accordance with some embodiments in the disclosure. FIG. 2A is a schematic diagram that illustrates an exemplary tailgate locking/unlocking system 100 of a vehicle 10 in accordance with some embodiments in the disclosure. FIG. 2B is a schematic diagram that illustrates an enlargement of a portion of the exemplary tailgate locking/unlocking system 100 of FIG. 2A in accordance with some embodiments in the disclosure.

Referring to FIG. 1 and FIG. 2A, in some embodiments, the vehicle 10 has a tailgate 12 disposed between a left lateral side 14 and a right latera side 16 of the vehicle 10 and extended along a width direction thereof. Moreover, in the present embodiment, the vehicle 10 has the tailgate locking/unlocking system 100, which is adapted to lock the tailgate 12 of the vehicle 10 to the left lateral side 14 and right lateral side 16 of the vehicle 10 or to unlock the tailgate 12 for releasing the tailgate 12 from the body 15 of the vehicle 10.

As shown in FIG. 1 and FIG. 2A, in the present embodiment, the tailgate locking/unlocking system 100 may include a rod shaft 110. The rod shaft 110 is disposed in the tailgate 12 of the vehicle 10 and extended along the width direction thereof. In the present embodiment, the rod shaft 10 may include a first end 112 disposed close to the left lateral side 14 of the vehicle 10 and a second end 114 disposed close to the right lateral side 16. As shown in FIG. 2A, the first end 112 of the rod shaft 110 is opposite to the second end 114.

Referring again to FIG. 2A and FIG. 2B, in some embodiments, the tailgate locking/unlocking system 100 may include a first handle assembly 130 pivotally coupled to the first end 112 of the rod shaft 110. In some other embodiments, the system 100 may further include a second handle assembly 140 pivotally coupled to the second end 114 of the rod shaft 110 opposite to the first end 112. In some embodiments, the first handle assembly 130 and the second handle assembly 140 may both be rachet wrench handle assemblies.

Referring to FIG. 2A, in the present embodiment, the first handle assembly 130 may include a first head portion 131 and a first handle portion 133. In addition, the second handle assembly 140 may also include a second head portion 141 and a second handle portion 143. In the present embodiment, the first handle portion 133 and the second handle portion 143 may respectively include receiving holes 133a and 143a configured for vehicle users' grips to the first handle portion 133 and to the second handle portion 143. In the present embodiment, through configurations of the receiving holes 133a, 143a, the user of the vehicle 10 can more easily grip the first handle portion 133 or the second handle portion 143 for pushing or pulling the first handle assembly 130 or the second handle assembly 140 to rotate along a clockwise direction or along a counterclockwise direction in relative to the vehicle 10.

Referring to FIG. 2B, the second handle assembly 140 is taken as an example to illustrate that a concave rachet 142 may be disposed in the second head portion 141 of the second handle assembly 140. In some other embodiments, the first handle assembly 130 may also include a concave rachet 132 disposed in the first head portion 131.

As shown in FIG. 2A and FIG. 2B, a tooth rachet 114a may be disposed at the second end 114 of the rod shaft 110, and the tooth rachet 114a may be axially inserted into the concave rachet 142 disposed in the first head portion 141. Similarly, a tooth rachet 112a may be disposed at the first end 112 of the rod shaft 110 for being axially inserted into the concave rachet 132 of the first handle assembly 130, which is disposed in the first head portion 131.

Referring again to FIG. 2A and FIG. 2B, in the present embodiment, the first handle assembly 130 may include a first lock structure 135 disposed at peripheries of the first head portion 131, and the second handle assembly 140 may include a second lock structure 145 disposed at peripheries of the second head portion 141. As shown in FIG. 2A and FIG. 2B, in the present embodiment, the first lock structure 135 and the second lock structure 145 may respectively be a first hook structure 135 and a second hook structure 145.

Referring to FIG. 2A and FIG. 2B, in some embodiments, both the first handle assembly 130 and the second handle assembly 140 may respectively further include end caps 137, 147 disposed to cover the concave rachets 132, 142 at the sides opposite to the sides of inserting the tooth rachet 112a and the tooth rachet 114a disposed at two opposite sides of the rod shaft 110.

Figure 3:
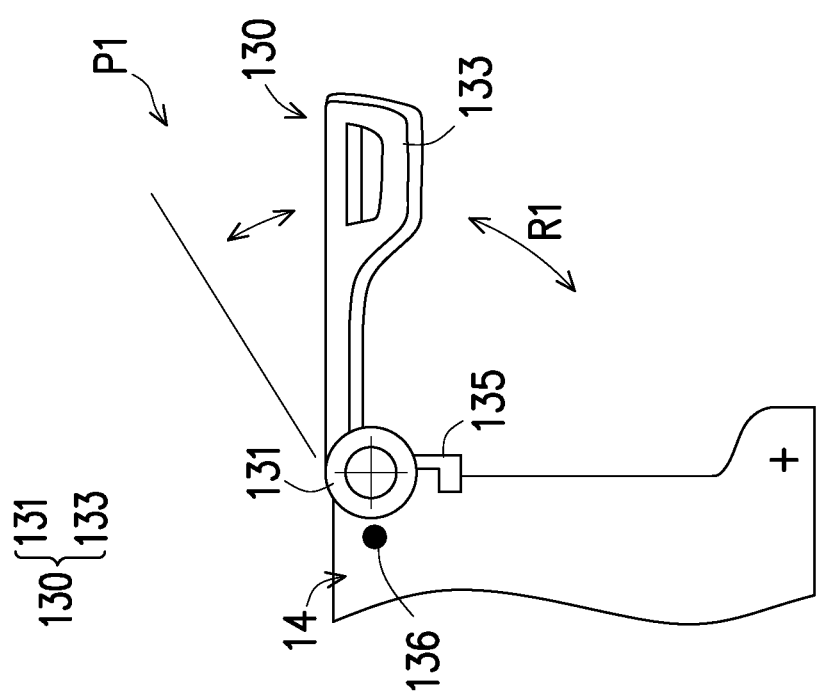
FIG. 3 is a schematic diagram that illustrates an exemplary handle assembly of the tailgate locking/unlocking system in accordance with some embodiments in the disclosure.

FIG. 3 is a schematic diagram that illustrates an exemplary handle assembly of the tailgate locking/unlocking system 100 in accordance with some embodiments in the disclosure. Referring to FIG. 1 and FIG. 3, in the present embodiment, the tailgate locking/unlocking system 100 may include a first receiver 136 disposed on the left lateral side 14 of the vehicle 10. In the present embodiment, as shown in FIG. 3, the first hook structure 130 is adapted to be engaged with the first receiver 136 for locking the tailgate 12 of the vehicle 10 to the body 15 thereof or adapted to actuate the first hook structure 130 to rotate away from the first receiver 136 by pushing the first handle portion 133 to rotate along a counterclockwise direction R1 for releasing the tailgate 12.

In another embodiment of the disclosure not illustrated, a second receiver (not shown) may be also disposed on the right lateral side 16 of the vehicle 10 for engaging with the second hook structure 145. In the present embodiment, the first receiver 136 and the second receiver may be respectively formed of column rods.

In the present embodiment, the first handle assembly 130 or the second handle assembly 140 may be pivotally coupled to tailgate 12 of the vehicle 10 through the rod shaft 110. As shown in FIG. 3, the first handle assembly 130 may be rotated to a release position P1, in which the first lock structure 135 is in preparation to be rotated away and released from the first receiver 136. In another embodiment not illustrated, the second handle assembly 140 may also be chosen for being pushed by the user of the vehicle 10 to be rotated to the release position P1 in preparation for being rotated away and released from the second receiver (not shown) disposed on the right lateral side 16 of the vehicle 10.

FIG. 4A to FIG. 4C are schematic motion diagrams that illustrate motion steps of an exemplary handle assembly of FIG. 3 in accordance with some embodiments in the disclosure. Referring FIG. 4A, in a state that the first handle assembly 130 located in an initial position P0, having a 0-degree rotational angle, the tailgate 12 is locked to the lateral side 14 of the vehicle 10 by an engagement of the first lock structure 135 with the first receiver 136. As shown in FIG. 4B and FIG. 4C, the first lock structure 135 is adapted to be rotated along the counterclockwise direction R1 for rotating away the first receiver 136 disposed on the left lateral side 14 of the vehicle 10 for releasing the tailgate 12 of the vehicle 10 from the body 15 of the vehicle 10.

Referring again to FIG. 4B, in a state that the first handle assembly 130 is rotated to the first rotational position P1, having a 90-degree rotational angle from the initial position P0, the tailgate 12 is in preparation to be released from the lateral side walls 14, 16 of the vehicle 10. As shown in FIG. 4B, the first handle portion 133 is rotated with 90 degrees in relative to the axis a1 of the rod shaft 110 from the initial portion P0 to the first rotational position P1, namely the releasing position of the first lock structure 135, such that the rod shaft 110 can be ratcheted to rotate with the first handle assembly 130, and the first lock structure 135 may be actuated by the first handle portion 133 of the first handle assembly 130 for being rotated away and released from the first receiver 136. As a result, the tailgate 12 of the vehicle 10 can be folded down from the rear end of the body 15 of the vehicle 10.

Referring to FIG. 4C, to ensure that first lock structure 135 is fully rotated away from the first receiver 136, the first handle portion 133 of the first handle assembly 130 may be further pushed by the user of the vehicle 10 to be rotated along a counterclockwise direction R1, for example, to a 110-degree rotational position P2, or even further, from the initial position P0. In the present embodiment, as the first handle assembly 130 is rotated to, for example, the 110-degree rotational position P2, the first lock structure 135 is further actuated to be rotated away from the first receiver 136 to reduce the structural intervention from the first handle assembly 130 as the tailgate 12 of the vehicle 10 being folded down to open a cargo loading space of the vehicle 10. In some embodiments not illustrated, the first handle assembly 130 can be further rotated beyond the 110-degree rotational portion P2 based on practical needs of operations, and the present embodiment is not limited herein.

In accordance with the embodiment in FIG. 4A to FIG. 4C, the first handle assembly 130 and the left lateral side 14 of the vehicle 10 are exemplarily illustrated for showing the motion paths of the first handle assembly 130. In some other embodiments, the second handle assembly 140 may have the same or similar motion paths simultaneously with the first handle assembly 130. Referring to FIG. 4A to FIG. 4C and FIG. 2A, FIG. 2B, the user of the vehicle 10 may choose to push either the first handle assembly 130 or the second handle assembly 140 along the counterclockwise direction R1 for rotating the rod shaft 110 together with both the first lock structure 135 and the second lock structure 145. In some embodiments, as the first handle assembly 130 being pushed by the user of the vehicle 10 to rotate along the counterclockwise rotational direction R1 shown in FIG. 4A to FIG. 4C, the first handle assembly 130 can actuate the rod shaft 110 to rotate along the rotational axis a1 thereof. In some embodiments, the rod shaft 110 can further actuate the second handle assembly 140 to rotate along with the first handle assembly 130 concurrently. Referring to FIG. 2A, FIG. 2B, FIG. 4B, and FIG. 4C, as the first lock structure 135 is rotated and released from the engagement with the first receiver 136, the second lock structure 145 of the second handle assembly 140 may be released simultaneously from the second receiver (not illustrated) disposed on the right lateral side 16 of the vehicle 10 through linkage and actuation of the rod shaft 110 coupled between the first handle assembly 130 and the second handle assembly 140.

In the present embodiment, due to the first handle assembly 130 and the second handle assembly 140 may respectively be rachet wrench handle assemblies, which may contain one-way mechanism that allows the rod shaft 110 coupled to the first handle assembly 130 and the second handle assembly 140 being rotated synchronously by cycling the first handle portion 133 or the second handle portion 143 along a clockwise direction or a counterclockwise direction. In the present embodiment, due to configuration of the rachet wrench handle assemblies, the tailgate 12 of the vehicle 10 can be released only when the first handle assembly 130 and/or the second handle assembly 140 lifted to a certain degree (e.g., 90 degrees) or even more (e.g., 110 degrees). Hence, safety is improved because the tailgate 12 of the vehicle cannot be opened randomly unless the first handle assembly 130 or the second handle assembly 140 are rotated, for example, beyond a 90-degree rotational position, namely, the rotational position P1 shown in FIG. 4B, from the initial position P0 of the first handle assembly 130 or the second handle assembly 140.

FIG. 5A and FIG. 5B are schematic diagrams that illustrate an exemplary handle assembly of the tailgate locking/unlocking system 100 in accordance with some embodiments in the disclosure. Referring to FIG. 5A, in the present embodiment, the first handle assembly 130 may include a first lock structure 137. The first lock structure may include a first hook leg 137a, a second hook leg 137b, and a latch 137c. Referring to FIG. 5A, as the first handle assembly 130 still stays in the initial position P0, that is, the rotational degree of the first handle assembly 130 is 0, the first hook leg 137a and the second hook leg 137b are engaged with each other to lock the first receiver 138 within a recess 137c1 of the latch 137c. In the present embodiment, through configuring the first hook assembly 130 including the first hook leg 137a and the second hook leg 137b, the first receiver 138 can be more securely held in the recess 137c1 of the latch 137c as the tailgate 12 of the vehicle is locked to the body 15 of the vehicle 10, such that the safety in operations of locking and unlocking the tailgate 12 of the vehicle 10 can be further assured.

As shown in FIG. 5A, the first handle assembly 130 may be rotated from the initial position P0 to the first rotational position P1, which is a 90-degree rotational position from the initial position P0, having 0 rotational degree. In the present embodiment, the first handle assembly 130 may be a rachet wrench handle assembly, and thereby as the rotational degree of the first handle assembly 130 is in a range between 0 degree and 90 degrees, the first receiver 138 is still held by the engagement between the first hook leg 137a and the second hook leg 137b in the recess 137c1 of the latch 137c.

As the rotational angle of the first handle assembly 130 is reaching 90 degrees for arriving at the first rotational position P1, the first handle portion 133 of the first handle assembly 130 may be respectively set to actuate the first hook leg 137a to rotate along a rotational axis a31 and to actuate the second hook leg 137b to rotate along a rotational axis a32 simultaneously. In the present embodiment, the axis a31 of the first hook leg 137a and the rotational axis a32 of the second hook leg 137b are extended parallelly along with the axis a1 of the rod shaft 110.

Referring to FIG. 5B, in the present embodiment, the first hook leg 137a and the second hook leg 137b may be actuated by further pushing the first handle portion 133 of the first handle assembly 130 from the 90-degree rotational position P1 to, for example, the 110-degree rotational position P2. As shown in FIG. 5B, the first hook leg 137a and the second hook leg 137b are actuated by the first handle assembly 130 to rotate away from each other in relative the latch 137c to open the space for holding the first receiver 138 therein. Hence, the first receiver 138 locked in the recess 137c1 of the latch 137c can be released. The tailgate 12 of the vehicle 10 can be released from the engagement with the both lateral sides 14 and 16 of the vehicle 10. In the present embodiment, the second handle assembly 140 may have the same or similar structure as the first handle assembly 130. As the first handle assembly 130 is rotated to unlock the tailgate 12 from the body 15 of the vehicle 10, the second hook assembly 140 may be actuated by the first hook assembly 130 through the linkage of the rod shaft 110 to simultaneously rotate therewith, such that the users of the vehicle 10 may merely push the first handle assembly 140 for actuating rotations of both the first handle assembly 130 and the second handle assembly 140, with the first lock structure 135 and the second lock structure 145 thereof, to unlock or lock the tailgate 12 to or from the body 15 of the vehicle 10.

In some other embodiments, the users of the vehicle 10 may also choose to push the second hook assembly 140 for rotation, for example, in a counterclockwise direction R1 as shown in FIG. 5B, which may also actuate both the first lock structure 135 and the second lock structure 145 of the first handle assembly 130 and the second handle assembly 140 to simultaneously rotate through linkage of the rod shaft 110 therebetween for unlocking the tailgate 12 from the body 15 the vehicle 10 and for opening the cargo loading space of the vehicle 10.

Figure 6:
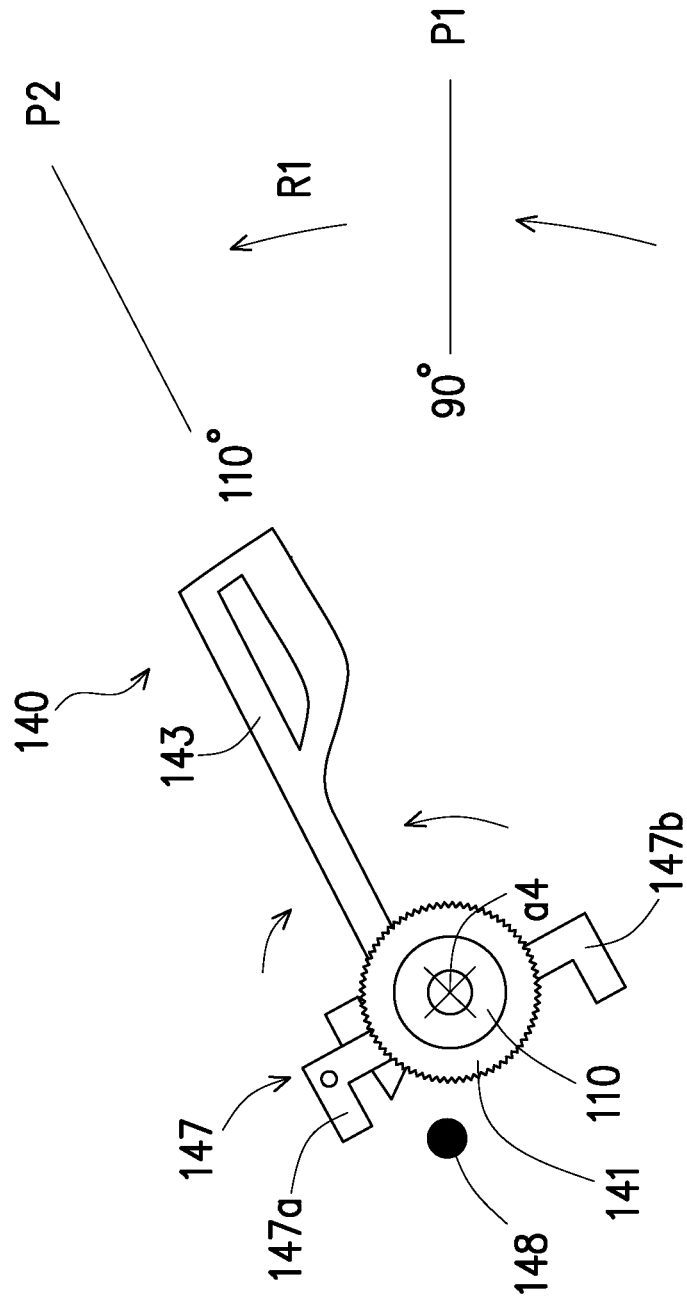
FIG. 6 is a schematic diagram that illustrate an exemplary handle assembly of a tailgate locking/unlocking system in accordance with some embodiments in the disclosure.

FIG. 6 is a schematic diagram that illustrate an exemplary handle assembly 140 of the tailgate locking/unlocking system 100 in accordance with some embodiments in the disclosure. As shown in FIG. 6, the handle assembly, for example the second handle assembly 140, may include a second handle portion 143, a second head portion 141, and a second lock structure 147. In the present embodiment, the second lock structure 147 may include a first hook leg 147a and a second hook leg 147b, which are respectively adapted to rotate along an axis a4 of rod shaft 110 and the second head portion 141 for locking or unlocking a second receiver 148 held and locked therebetween. As the status of the second handle assembly 140 shown in FIG. 6, the second handle portion 143 of the second handle assembly 140 may be further pushed by the user of the vehicle 10 from the 90-degree rotational position P1 towards a 110-degree rotational position P2 along the counterclockwise direction R1 for simultaneously rotating the first hook leg 147a and the second hook leg 147b to release the second receiver 148.

In accordance with the embodiments of FIG. 6, as the second handle assembly 140 is rotated to the 90-degree rotational position P1, the second handle assembly 140 is ratcheted to rotate with the rod shaft 110, such that as the second handle assembly 140 is further pushed to, for example, the 110-degree rotational position P2, the first handle assembly 130 pivotally coupled to another side of the rod shaft 110 may be driven by the rotation of the second handle assembly 140 and the rod shaft 110 to simultaneously release the engagement of the tailgate 12 of the vehicle 10 with the two opposite lateral sides 14, 16 thereof as shown in FIG. 1.

Figure 7:
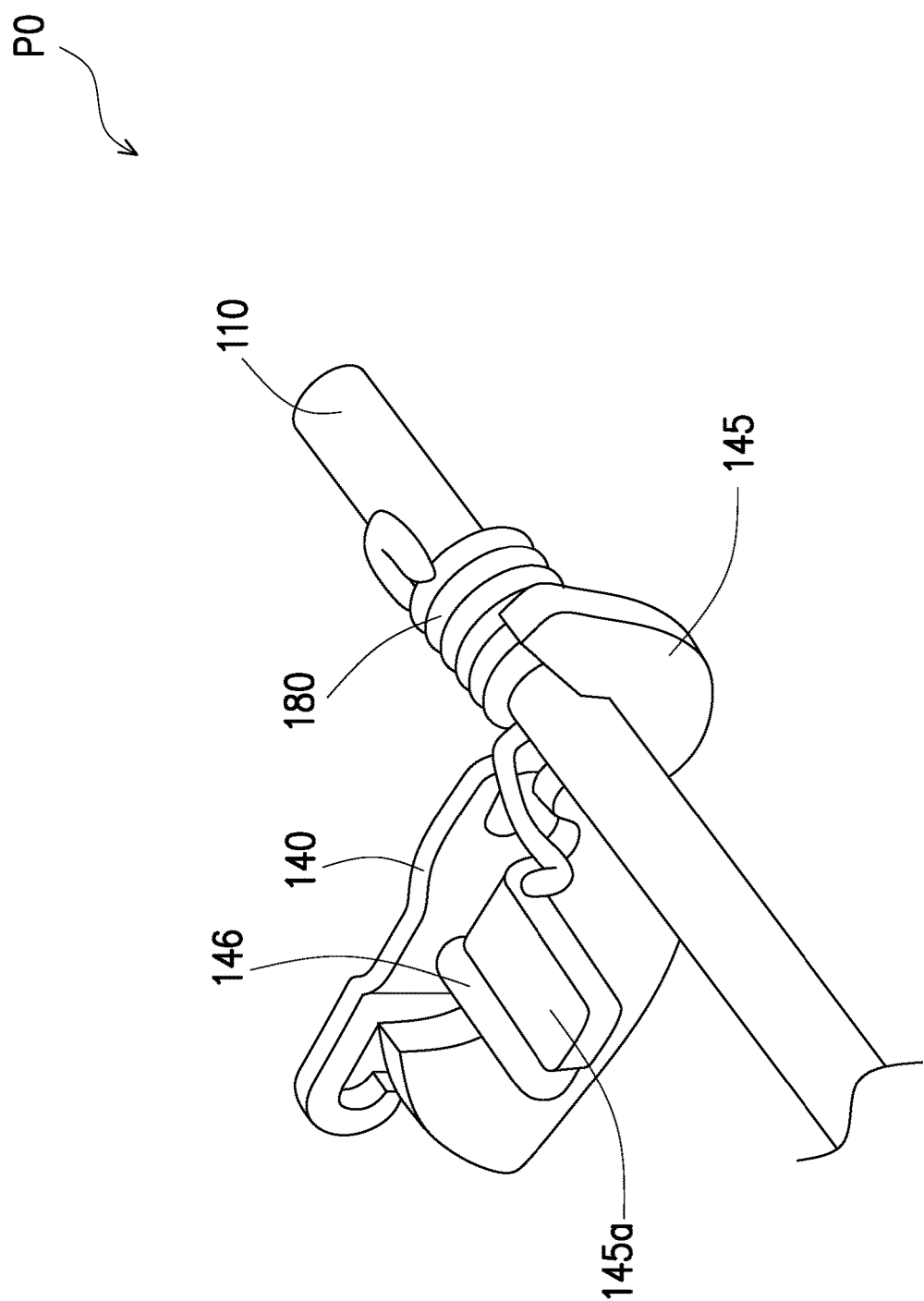
FIG. 7 is a schematic diagram that illustrate an exemplary handle assembly of a tailgate locking/unlocking system in accordance with some embodiments in the disclosure.

FIG. 7 is a schematic diagram that illustrate an exemplary handle assembly of the tailgate locking/unlocking system 100 in accordance with some embodiments in the disclosure. In some aspects of the present disclosure, referring to FIG. 2A and FIG. 7, a coil spring 180 may be further pivotally sleeved on the first side 112 or the second side 114 of the rod shaft 110 along the axial direction thereof. As shown in FIG. 2A, FIG. 2B, and FIG. 7, as the first handle assembly 130 or the second handle assembly 140 is selectively pushed by the user of the vehicle 10 and rotated to the first rotational position P1, a releasing position, in preparation for releasing an engagement between, for example, the second lock structure 145 and the second receiver 146 of the second handle assembly 140 shown in FIG. 7.

As shown in FIG. 2A, FIG. 2B, and FIG. 7, as the user of the vehicle 10 further pushes the second handle assembly 140 along the counterclockwise direction R1 from the 90-degree rotational position P1 to for example, the 110-degrees rotational position P2, the second receiver 146 can be released from the engagement with the second hook structure 145, such that the tailgate 12 of the vehicle 10 is released from the body 15 of the vehicle 10 to open a cargo loading space the vehicle 10. As the tailgate 12 of the vehicle 10 is released, the user of the vehicle 10 may loosen a grip of the second handle assembly 140, and a restoring force of the coil spring 180 may pull the second handle assembly 140 to rotate along the axis a1 of the rod shaft 110 along a clockwise direction back to the initial position P0 shown in FIG. 7, namely, the position before the rotation of the second handle assembly 140. In some other embodiments, the user of the vehicle 10 may also push the first handle assembly 130 to rotate to the 90-degree rotational position P1 or even further to the 110-degree rotational position P2, and the coil spring 182 pivotally sleeved to the rod shaft 110 may also provide restoring force to the first handle assembly 130 for returning to the initial position P0 shown in FIG. 7.

In the present embodiment, relying on the restoring force of the coil spring 180, after the user of the vehicle 10 pushing the first handle assembly 130 or the second handle assembly 140 to the release position, the 90-degree rotational position P1, as shown in FIG. 3, the first handle assembly 130 or the second handle assembly 140 can be directly released from the user's grip without needs of being continuously held by the user's hands for restoring the first handle assembly 130 or the second handle assembly 140 back to the initial position P0 shown in FIG. 7.

Referring to FIG. 7, in the present embodiment, the second lock structure 145 may have a protrusion 145a extended along a direction of the extension direction of the second receiver 146. Accordingly, as the second handle assembly 140 stays in the initial position P0, the protrusion 145a of the second lock structure 145 may be removably in contact with the second receiver 146 for blocking and stopping the rotation of the second handle assembly 140 and for looking the tailgate 12 to the rear side of the vehicle 10. As shown in FIG. 7, in the present embodiment, the second receiver 146 may be formed of a column rod.

Figure 8:
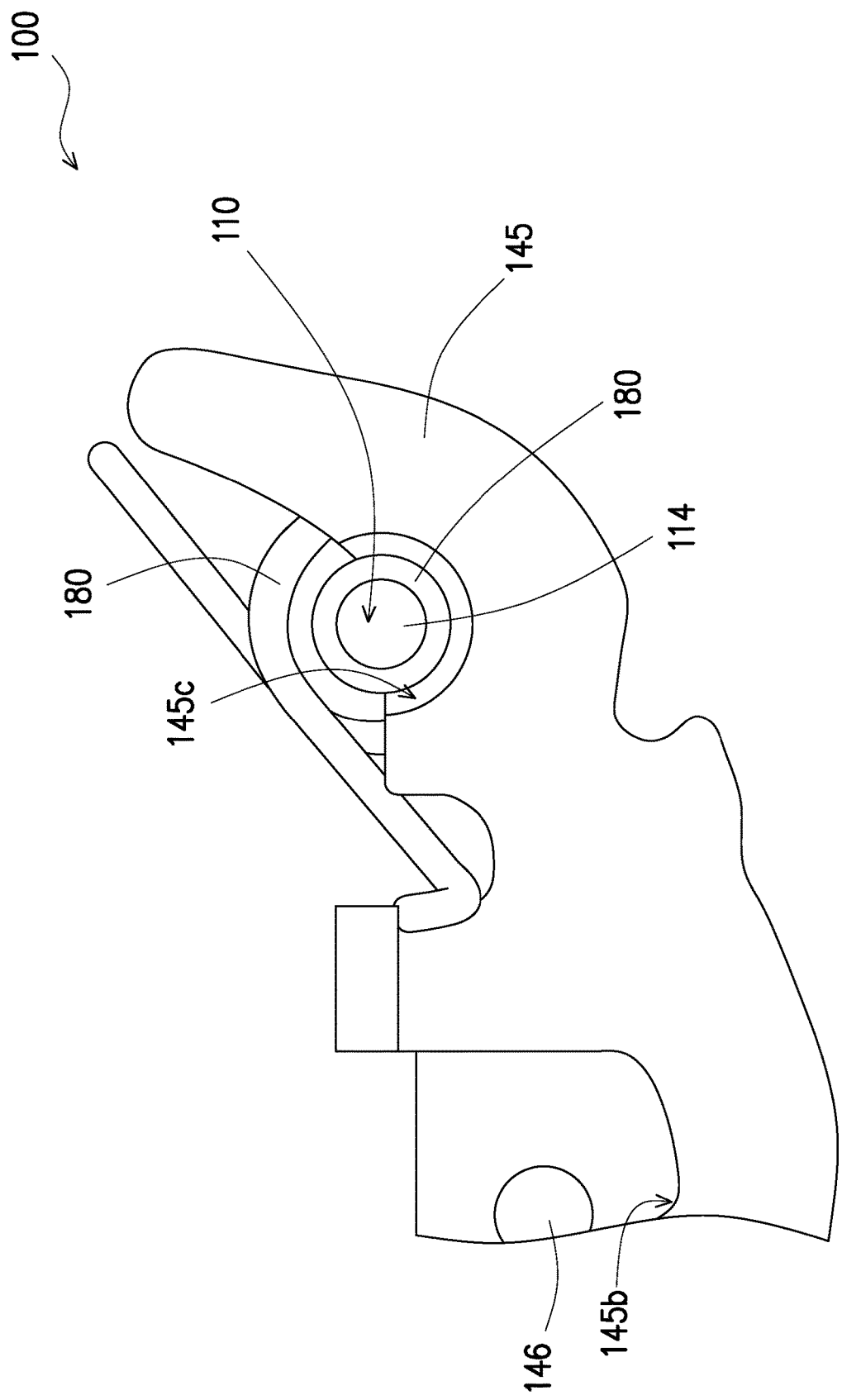
FIG. 8 is a schematic diagram that illustrate an enlargement view of a portion of the exemplary handle assembly of FIG. 7 in accordance with some embodiments in the disclosure.

FIG. 8 is a schematic diagram that illustrate an enlargement view of a portion of the exemplary handle assembly of FIG. 7 in accordance with some embodiments in the disclosure. Referring to FIG. 7 and FIG. 8, in some embodiments, the second lock structure 145 may include a concave portion 145b for receiving the second receiver 146 therein. Moreover, as shown in FIG. 8, the second lock structure 145 may also include a recess 145c that accommodates the rod shaft 110 and the coil spring 180 pivotally sleeved thereon. In some embodiments, the second lock structure 145 is rotated in relative to the second end 114 of the rod shaft 110 and the coil spring 180 accommodating in the recess 145c of the second lock structure 145. In some embodiments not illustrated, the first handle assembly 130 and the second handle assembly 140 may both include the handle portions for actuating the rotation of the first and second lock structures 135, 145 to simultaneously rotate around the axis of the rod shaft 110.

Figure 9:
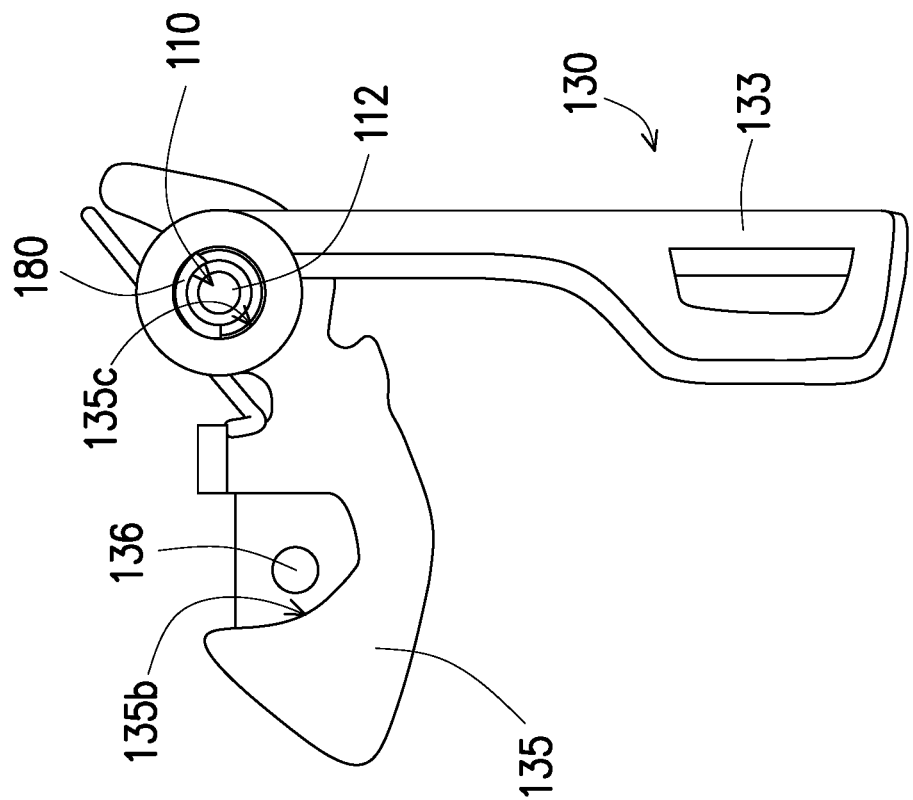
FIG. 9 is a schematic diagram that illustrate an exemplary handle assembly of the tailgate locking/unlocking system in accordance with some embodiments in the disclosure.

FIG. 9 is a schematic diagram that illustrate an exemplary handle assembly of the tailgate locking/unlocking system 100 in accordance with some embodiments in the disclosure. Referring to FIG. 9, in the present embodiment, the handle assembly, for example the first handle assembly 130 may include a first hook structure 135, which is adapted to engage with the first receiver 136 disposed on the left lateral side 14 of the vehicle 10. In the present embodiment, the first hook structure 135 may include a concave portion 135b for receiving the first receiver 136 therein for engaging with the first hook structure 135. Moreover, as shown in FIG. 9, the first hook structure 135 may also include a recess 135c that accommodates the first end 112 of the rod shaft 110 and a coil spring 180 pivotally sleeved thereon. In some embodiments, the user of the vehicle 10 may either push the first handle assembly 130 in FIG. 9 or the second assembly 140 in FIG. 7 for rotation of the rod shaft 110 and both the first hook structure 135 and the second hook structure 145 for locking the tailgate 12 to the body 15 of the vehicle shown in FIG. 1 or unlocking the tailgate 12 therefrom.

In light all the embodiments above, in the present disclosed system, 100 a rod shaft 110 is disposed on a tailgate 12 of a vehicle 10. The vehicle 10 herein may be referred to a mini truck, a side-by-side vehicle (SSV), or a utility task vehicle but the present disclosure is not limited herein. The rod shaft 110 may be disposed in the tailgate 12 of the vehicle 10, which is extended along the width direction thereof. In some aspects of the disclosure, at least one handle assembly, for example the first handle assembly 130, may be coupled to the rod shaft 110, which may be pushed and ratcheted to pivotally rotate along an axis a1 of the rod shaft 110. In the present disclosure, as the first handle assembly 130 is rotated along the axial direction of the rod shaft 110 by the user, the first handle assembly 130 may actuate the second handle assembly 140 to synchronously rotate together by their structural linkage through the rod shaft 110 connected therebetween. In some other embodiments, the second handle assembly 140 may be also pushed by the user for synchronously rotating both the first handle assembly 130 and the second handle assembly 140, and the rod shaft 110 linked therebetween. Hence, in the present embodiment, the tailgate 12 of the vehicle 10 can be locked or unlocked by merely the pushing (or pulling) a single handle assembly, for example the first handle assembly 130 or the second handle assembly 140, through the user of the vehicle 10 for reducing difficulties in opening the tailgate 12.

What is claimed is:

1. A vehicle tailgate locking/unlocking system, adapted to lock or unlock a tailgate of a vehicle, comprising:
   a rod shaft, disposed in the tailgate of the vehicle and extended along a width direction thereof, wherein the rod shaft has a first end and a second end opposite to the first end;
   a first lock structure, coupled to the first end;
   a second lock structure, coupled to the second end;
   at least one handle assembly, pivotally coupled to the first end or the second end of the rod shaft and coupled to the first lock structure or the second lock structure;
   a first receiver disposed on a first lateral side of a body of the vehicle for engaging with the first lock structure; and
   a second receiver disposed on a second lateral side of the body of the vehicle for engaging with the second lock structure,
   wherein both the first lock structure and the second lock structure are respectively locked to or unlocked from the first receiver and the second receiver by rotating the at least one handle assembly.

2. The system of claim 1, wherein the at least one handle assembly comprises a first handle assembly and a second handle assembly pivotally coupled to the first end and the second end of the rod shaft, and the first handle assembly and the second handle assembly are respectively coupled to the first lock structure and the second lock structure.

3. The system of claim 2, wherein when the first handle assembly is pivotally rotated in relative to the rod shaft, the second handle assembly is configured to be driven by the first handle assembly and the rod shaft to synchronously rotate therewith.

4. The system of claim 1, wherein the first lock structure and the second lock structure are a first hook structure and a second hook structure adapted to be actuated by the at least one handle assembly for removably engaging with the first receiver and the second receiver respectively.

5. The system of claim 1, wherein the first lock structure comprises a first hook leg and a second hook leg both actuated by the at least one handle synchronously for removably engaging with the first receiver.

6. The system of claim 1, wherein when a longitudinal direction of the at least one handle assembly is parallel to a height direction of the vehicle, the first lock structure and the second lock structure are respectively engaged and locked with the at the first receiver and the second receiver.

7. The system of claim 1, wherein when a longitudinal direction of the at least one handle assembly is perpendicular to a height direction of the vehicle and perpendicular to an axial direction of the rod shaft, the first lock structure and the second lock structure are pivotally rotated along the axial direction of the rod shaft to a release position.

8. The system of claim 1, further comprising a coil spring pivotally sleeved on the first end or the second end of the rod shaft configured for providing a restoring force to the at least one handle assembly.

9. The system of claim 8, wherein the first lock structure comprises a first concave portion and a first recess, wherein the first concave portion is configured for accommodating the first receiver, and the first recess is configured for disposing the first end of the rod shaft and the coil spring pivotally sleeved thereon.

10. The system of claim 8, wherein the second lock structure comprises a second concave portion and a second recess, wherein the second concave portion is configured for accommodating the second receiver, and the second recess is configured for disposing the second end of the rod shaft and the coil spring pivotally sleeved thereon.

11. The system of claim 8, wherein the first receiver and the second receiver are respectively formed of column rods configured for engaging with the first lock structure and the second lock structure.

* * * * *